Feb. 26, 1957 — K. P. BILLNER — 2,783,078
HANDLING APPARATUS
Filed March 7, 1952

Inventor
KARL P. BILLNER

Feb. 26, 1957 K. P. BILLNER 2,783,078
HANDLING APPARATUS
Filed March 7, 1952 2 Sheets-Sheet 2

Inventor
KARL P. BILLNER
By Raymond W. Colton
Attorney

United States Patent Office 2,783,078
Patented Feb. 26, 1957

2,783,078

HANDLING APPARATUS

Karl P. Billner, Philadelphia, Pa., assignor to Vacuum Concrete, Inc., a corporation of Pennsylvania Application March 7, 1952, Serial No. 275,384

14 Claims. (Cl. 294—65)

This invention relates to handling apparatus combining interdependent vacuum and mechanical features. The resulting apparatus provides greater safety and more rapid manipulation than has been possible with comparable apparatus for the purpose.

For a number of applications, the use of vacuum alone has been highly satisfactory for the handling of materials, but in other applications, damage to a vacuum line or stoppage of the vacuum pump might have serious consequences. Then, there are situations where a load must be transported over a substantial distance, rendering it inconvenient to maintain vacuum conditions during the entire operation. While various safety devices have been proposed to supplement vacuum handling apparatus, they have required an undue amount of manual effort and attention.

The use of grapples, tongs and various other forms of mechanical lifters alone, is of course quite common, but many times it is necessary to elevate a load by some supplemental means before the load can be effectively engaged. Where mechanical lifting apparatus is employed solely, manual adjustment and manipulation requirements are usually excessive.

In accordance with the present invention, vacuum and mechanical principles have been combined so as to contribute jointly to improvements from the standpoints of safety, simplicity, speed and effectiveness, beyond anything known to exist in the prior art.

The handling apparatus of this invention comprises a frame, a hollow mat secured to the frame defining a chamber having an open end, a deformable sealing gasket secured at the open end for engagement with a portion of a load, conduit means communicating with the chamber for exhausting fluid therefrom, a plurality of levers each having a load engaging arm and a force applying arm, and a pivot intermediate these arms connecting each of the levers with the frame, the force applying arms providing suspension attaching means intermediate thereof. The force applying arms may overlie the frame and assume a crossed relationship above the frame. The suspension elements are preferably connected near the balance points of the levers under no load conditions, and in most applications, these connections are slightly displaced from the balance points and lie intermediate the pivots and balance points so as to bias the load engaging arms away from one another under no load conditions.

The balance of the system thus defined may be adjusted by the provision of adjustable weights on the levers and/or by selectively shifting the points of suspension along the levers.

The hollow mat preferably depends from the lower surface of the frame and the load engaging arms preferably carry heads or hooks for entering into a gripping relationship with the load. The levers are preferably angular in elevation, having their force applying arms extending above the frame and their load engaging arms extending therebelow and in spaced relationship with respect to the mat.

The system is so balanced that ordinarily, the load engaging arms do not become attached to the load until after a portion of the weight of the load has been assumed by the apparatus through the application of vacuum. Once the load engaging arms do become attached to the load however, the vacuum can be discontinued and the hose connections removed if desired. By properly designing the apparatus, the sealing gasket carried by the hollow mat may remain somewhat deformed even after the vacuum has been discontinued, so that the load will be clamped between the gasket and the load engaging arms of the levers. To detach the load from the apparatus, it is necessary only that the load be deposited on a surface that will assume its weight, whereupon the counterbalanced condition of the levers will cause the load engaging arms to swing away from the load, provided that the vacuum has been discontinued.

Where vacuum is continued throughout a handling operation, it will be evident that the load engaging arms serve as safety devices to prevent disengagement of the load even though there should be a failure in the vacuum system. Where a load is resting on the ground or a floor and provides no space for the introduction of the load engaging arms, it will be evident that the presence of the vacuum applying mat will elevate the load upon the application of a lifting force, permitting the load engaging arms to swing under the load when it has become elevated sufficiently.

A plurality of such devices suspended from a single frame provides a number of important applications of the present invention as in the handling of extended loads or multiple elements such as nested drums.

A more complete understanding of the invention will follow from a detailed description of the accompanying drawings wherein.

Figure 1:
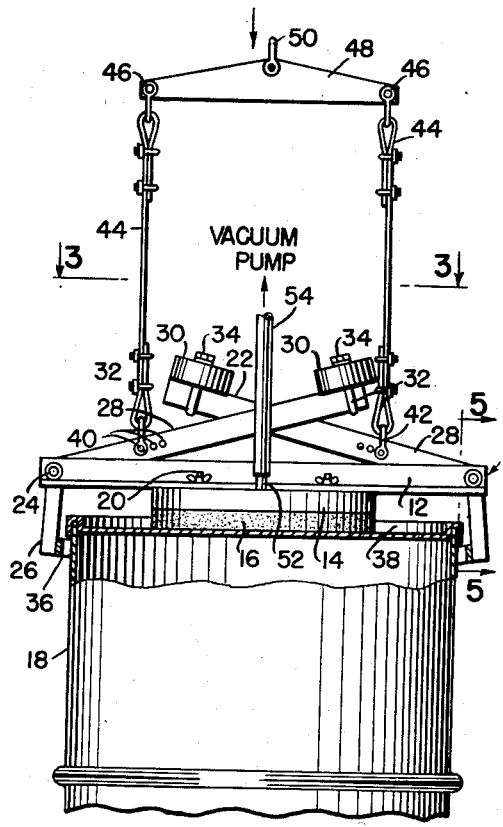
Fig. 1 is an elevation depicting the apparatus of the present invention as it is being lowered to engage a drum.
Figure 3:
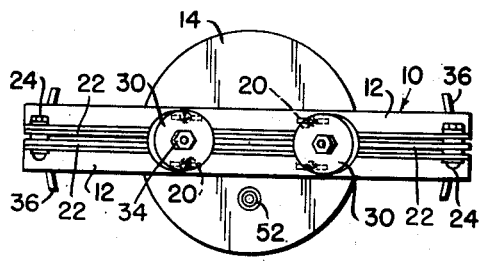
Fig. 3 is a plan of a portion of the apparatus shown in Fig. 1, looking from the horizontal plane denoted by line 3—3.
Figure 4:
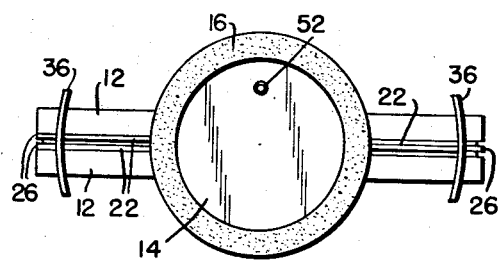
Fig. 4 is a bottom plan view of the apparatus of Fig. 1, omitting the drum.
Figure 5:
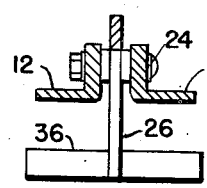
Fig. 5 is a section taken along line 5—5 of Fig. 1.

The apparatus depicted in Fig. 1 comprises a frame 10 defined by spaced angles 12, to the lower or horizontal flanges thereof is secured a hollow mat 14 defining a chamber having an open end carrying a deformable sealing gasket 16 of sponge rubber or the like for engagement with the surface of a load, shown in this figure as a metal drum 18. The angles 12 may be maintained in their spaced relationship by means of the bolts 20 which secure them to the mat 14 and if desired, the angles can be secured together in any additional manner. Between the spaced vertical flanges of the angles, levers 22 are introduced and related thereto by means of pivots 24 which may assume the form of bolts as shown in Fig. 5. The levers 22 have been depicted as made up of bars of rectangular section, angular in elevation, defining load engaging arms 26 extending below their pivots and force applying arms 28 extending above the pivots and angles 12. When these force applying arms overlie the frame in crossed relationship as depicted in the drawings, they must clear one another so as to move freely. This has been accomplished as depicted most clearly in Fig. 3 by fabricating the left hand arm of two bars fixed in spaced relationship so as to receive freely between them the single bar constituting the force applying arm 28 of the right hand lever 22. Counterweights 30 are adjustably secured to the force applying arms by means of U-bolts 32 whose positions can be shifted by loosening the nuts 34. Where it is desired to avoid the crossed relationship of the levers, they can be shortened and additional weight can be employed to compensate the reduced lever arms.

The load engaging arms 26 are provided at their ends with hooks or heads 36 for engaging the load, and in the case illustrated in Fig. 1, they will engage under the bead 38 formed near the upper edge of the drum. The force applying arms 28 are provided with a plurality of openings 40 for the reception of clevices 42 to which suspensions in the form of cables 44 are suitably clamped at their lower ends, the upper ends of the cables 44 being similarly connected through clevices 46 to a spreader bar 48 depending from the lower end of a hoist cable 50.

The vacuum mat 14 carries a nipple 52 communicating with its hollow chamber, the nipple receiving the end of a hose 54 communicating with a vacuum pump, not shown. The openings 40 provided in the force applying arms can selectively receive the clevices 42 for adjustment of the balance of the system of levers thus far described. As shown in Fig. 1, the counterweights 30 and the clevices 42 have been adjusted so that under no load conditions, the hooks or heads 36 carried by the load engaging arms 26 are separated sufficiently to permit them to freely pass over the bead 38 of the drum 18. When the apparatus has been lowered to bring the gasket 16 into contact with the head of the drum 18, vacuum can be applied by the manipulation of valves or by the use of automatic valving of the type described in Billner Patent No. 2,578,220 dated December 11, 1951. As soon as sufficient reduction in pressure between the mat and the head of the drum has occurred, the gasket 16 will be deformed and the hoist will be operated to elevate the system and its load through the cable 50, the added weight of the drum then overbalancing the levers 22 about their fulcrums defined by the clevices 42, causing the heads 36 of the load engaging arms 26 to assume positions under the drum bead 38. At this point, the vacuum can be discontinued and the hose 54 removed from the nipple 52 if desired, permitting transportation of the load without necessitating movement of the vacuum hose or other vacuum apparatus. When the hoist is operated to lower the load, as it engages the ground or other support, its weight is no longer imposed upon the frame, whereupon the load engaging arms 26 and their heads 36 will swing outwardly and once again clear the bead 38 of the drum 18.

Figure 2:
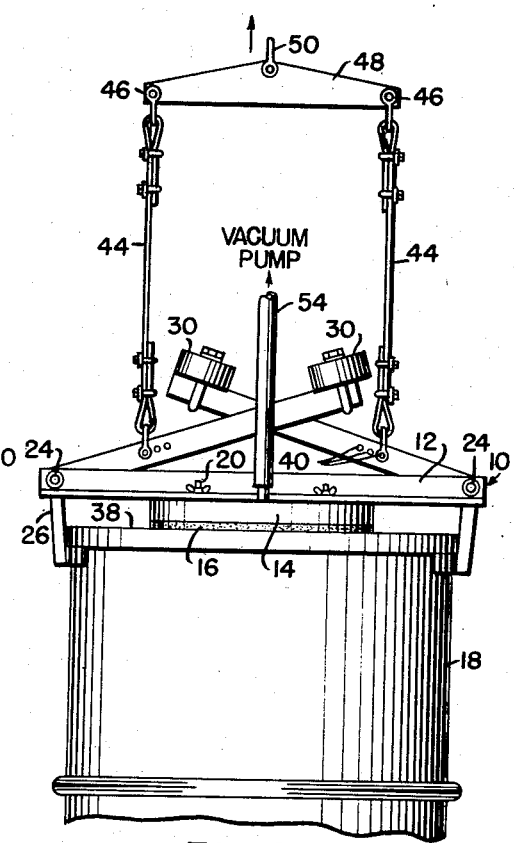
Fig. 2 is an elevation similar to that depicted in Fig. 1, showing the apparatus engaging the drum and suspending it.

The condition depicted in Fig. 2 shows the heads 36 of the load engaging arms 26 in operative engagement with the load below the bead 38, the arrow adjacent the hoist cable 50 indicating that the movement of the apparatus has been upward sufficiently to add at least a portion of the weight of the drum 18 to that of the frame 12. It is at this point that the hose 54 can be disconnected if desired or the vacuum pump brought to a standstill. The gasket 16 as shown in Fig. 2 has been deformed so that its height is reduced appreciably as compared with the showing in Fig. 1. Thus, the drum is clamped between the heads 36 and the frame 10 in a resilient manner by properly designing the gasket and its relationship to the other portions of the apparatus.

Figure 6:
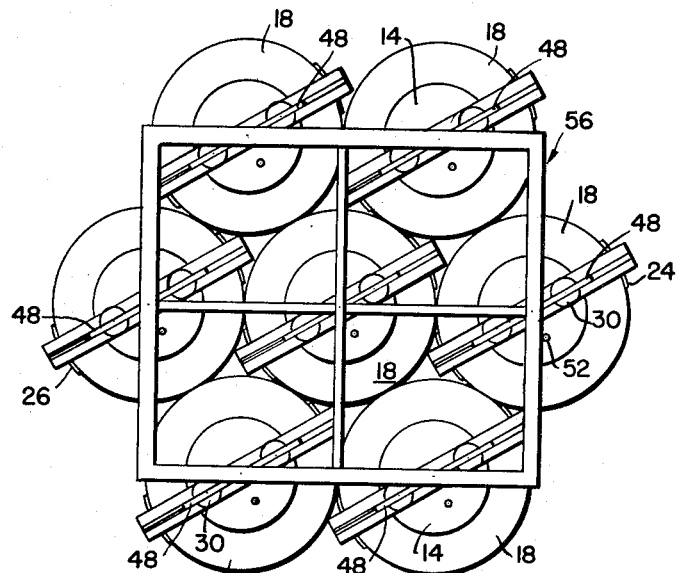
Fig. 6 is a somewhat diagrammatic plan of a form of the apparatus intended to handle a plurality of nested drums.

The invention has been depicted in Fig. 6 in a form intended to handle a plurality of nested drums 18 by suspending a plurality of the devices depicted in the preceding figures from a lifting frame 56 interposed between the hoist cable or cables and the spreader bars 48 of each of the devices employed. The number of such devices that can be employed in a single piece of equipment will be limited only by the capacity of the hoist and pump and the physical limitations of the working area available. Accordingly, the seven drums depicted in Fig. 6 will be merely indicative of the manner in which other numbers of such drums or other types of loads might well be handled similarly.

Figure 7:
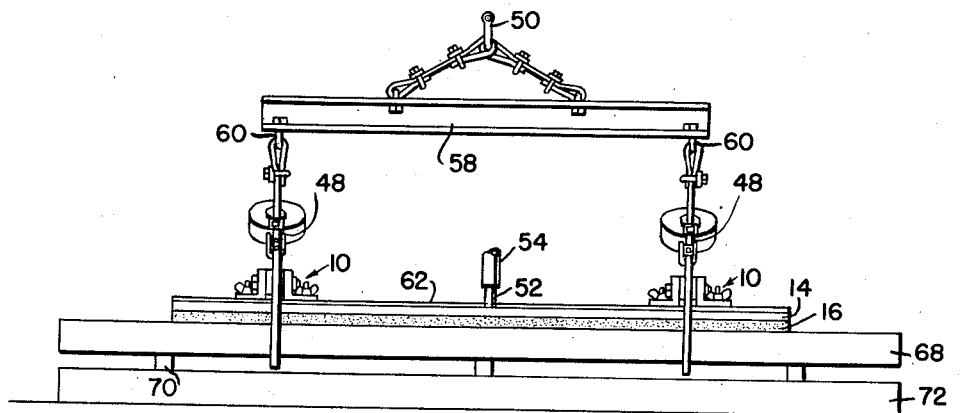
Fig. 7 is an elevation of a modified form of the apparatus for handling various types of loads.
Figure 8:
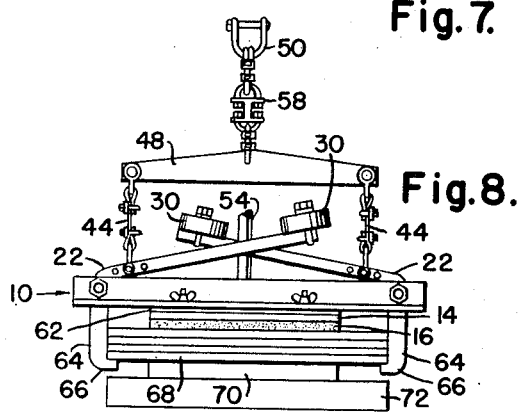
Fig. 8 is an end elevation of the apparatus depicted in Fig. 7.

Figs. 7 and 8 illustrate another form of the invention applicable to extended bodies where spaced engagements are desired for purposes of stability. In this case, the hoist cable 50 supports an intermediate spreader bar 58 which is in turn connected to spreader bars 48 by means of flexible cables or the like 60. In this case, the frames 10 extend transversely across the mat 14 which may be provided with a reinforcing backing 62 made up of suitable sections. The only other substantial difference of this form of the invention over that depicted in the preceding figures is the configuration of the load engaging arms 64 which are elongated so that their hooks 66 will be received under the load 68, the upper stack of which is supported on spacers 70 which in turn rest upon a lower stack 72 which has its lower surface in contact with the ground. As the hoist lowers the system depicted in these figures, the hooked ends 66 will be spread sufficiently to clear the stack of material 68, or slab or other load to be handled, and the deformable sponge rubber gasket 16 will engage the upper surface of the load. Then the vacuum will be applied, either automatically as disclosed in the patent already mentioned, or otherwise, pulling the frame down upon the load and deforming the gasket. Then the hoist will be actuated tending to lift the load, the added weight then overbalancing the portions of the force applying arms lying beyond the suspension attachment points, causing the hooks 66 to engage under the load. Then, as previously discussed in connection with the preceding figures, the vacuum effect can be discontinued if desired. It will be evident that with load engaging arms of the type depicted in Fig. 8, there would be a tendency to straighten the elements constituting the load should there be several sheets such as sheet metal for example. In such a case, the balance adjustment would be such that the addition of the weight of the top sheet to the apparatus would be sufficient to contract the load engaging arms to their desired positions beneath the load.

When the lowermost body 72 is reached, it is necessary that a portion of the lifting be performed by the vacuum mat until the body has been elevated sufficiently above the ground for the hooks 66 to move under the body.

Whereas only a relatively few forms of the invention have been depicted for purposes of illustration, it will be evident to those skilled in the art that a vast variety of applications can be made, and accordingly, the arrangements specifically shown in the drawings should not be construed as limiting beyond the scope of the appended claims.

I claim:

1. Handling apparatus comprising a frame, a hollow mat secured to and entirely supported by said frame defining a chamber having an open end extending below said frame, a compressible sealing gasket secured at said open end for engagement with a portion of a load, conduit means communicating with said chamber for exhausting fluid therefrom and compressing said gasket against said load, a plurality of levers each having a load engaging arm and a force applying arm carrying counterbalance means, and a pivot intermediate said arms connecting each of said levers with said frame, said force applying arms providing suspension attaching means intermediate said counterbalance means and pivot and said load engaging arms projecting beyond said gasket for engagement with said load when said gasket is compressed.

2. Handling apparatus comprising a frame, a hollow mat secured to and entirely supported by said frame defining a chamber having an open end extending below said frame, a deformable sealing gasket secured at said open end for engagement with a portion of a load, conduit means communicating with said chamber for exhausting fluid therefrom and deforming said gasket, a plurality of levers each having a load engaging arm and a force applying arm carrying counterbalance means, and a pivot intermediate said arms connecting each of said levers with said frame, said force applying arms overlying said frame and providing suspension attaching means intermediate said counterbalance means and pivot and said load engaging arms projecting beyond said gasket for engagement with said load when said gasket is deformed.

3. Handling apparatus comprising a frame, a hollow mat secured to and entirely supported by said frame defining a chamber having an open end extending below said frame, a deformable sealing gasket secured at said open end for engagement with a portion of a load, conduit means communicating with said chamber for exhausting fluid therefrom and deforming said gasket, a plurality of levers each having a load engaging arm and a force applying arm, said load engaging arm projecting beyond said gasket for engagement with said load when said gasket is deformed, a pivot intermediate said arms connecting each of said levers with said frame, and suspension elements connected to said force applying arms at intermediate portions thereof at which opposing moments applied thereto at no load are substantially equal.

4. Handling apparatus comprising a frame, a hollow mat secured to and entirely supported by said frame defining a chamber having an open end extending below said frame, a deformable sealing gasket secured at said open end for engagement with a portion of a load, conduit means communicating with said chamber for exhausting fluid therefrom, a plurality of levers each having a load engaging arm and a force applying arm, a pivot intermediate said arms connecting each of said levers with said frame, and suspension elements connected to intermediate portions of said force applying arms at which opposing moments applied to said levers at no load are substantially balanced.

5. Handling apparatus comprising a frame, a hollow mat secured to and entirely supported by said frame defining a chamber having an open end extending below said frame, a deformable sealing gasket secured at said open end for engagement with a portion of a load, conduit means communicating with said chamber for exhausting fluid therefrom, a plurality of levers each having a load engaging arm and a force applying arm, a pivot intermediate said arms connecting each of said levers with said frame, and suspension elements connected to intermediate portions of said force applying arms slightly displaced from points at which opposing moments applied to said levers at no load are substantially balanced.

6. Handling apparatus comprising a frame, a hollow mat secured to and entirely supported by said frame defining a chamber having an open end extending below said frame, a deformable sealing gasket secured at said open end for engagement with a portion of a load, conduit means communicating with said chamber for exhausting fluid therefrom, a plurality of levers each having a load engaging arm and a force applying arm, a pivot intermediate said arms connecting each of said levers with said frame, and suspension elements connected to said force applying arms intermediate said pivots and points at which opposing moments applied to said levers at no load are substantially balanced.

7. Handling apparatus comprising a frame, a hollow mat secured to and entirely supported by said frame defining a chamber having an open end extending below said frame, a deformable sealing gasket secured at said open end for engagement with a portion of a load, conduit means communicating with said chamber for exhausting fluid therefrom, a plurality of levers each having a load engaging arm and a force applying arm, a pivot intermediate said arms connecting each of said levers with said frame, said force applying arms providing suspension attaching means, and means carried by said force applying arms on the side of said suspension attaching means opposite the side of said force applying arms connected by said pivots for adjusting the balance of said levers.

8. Handling apparatus comprising a frame having upper and lower surfaces, a hollow mat secured to and entirely supported by the lower surface of said frame defining a chamber having an open end extending below said frame, a deformable sealing gasket secured at said open end for engagement with a portion of a load, conduit means communicating with said chamber for exhausting fluid therefrom and deforming said gasket, a plurality of levers each having a load engaging arm and a force applying arm, heads carried by said load engaging arms for gripping a load when said gasket is deformed, a pivot intermediate said arms connecting each of said levers with said frame, and suspension attaching means provided substantially at the no load balance points of said force applying arms.

9. Handling apparatus comprising a frame, a hollow mat depending from and entirely supported by said frame defining a chamber having an open end extending below said frame, a deformable sealing gasket secured at said open end for engagement with a portion of a load, conduit means communicating with said chamber for exhausting fluid therefrom, a plurality of angular levers each having a load engaging arm extending above said frame and a force applying arm extending below said frame, a pivot intermediate said arms connecting each of said levers with said frame, and suspension attachment means provided on intermediate portions of said force applying arms near points at which opposing moments applied to said levers at no load are substantially balanced.

10. Handling apparatus comprising a frame, a hollow mat depending from and entirely supported by said frame defining a chamber having an open end extending below said frame, a deformable sealing gasket secured at said open end for engagement with a portion of a load, conduit means communicating with said chamber for exhausting fluid therefrom, a plurality of levers having load engaging arms in crossed relationship above said frame and force applying arms spaced from said mat, a pivot intermediate said arms connecting each of said levers with said frame, and suspension elements engaging intermediate portions of said force applying arms near points at which opposing moments applied to said levers at no load are substantially balanced.

11. Handling apparatus comprising a frame, a plurality of hollow mats entirely supported by said frame, each mat defining a chamber having an open end extending below said frame, a deformable sealing gasket secured at the open end of each mat for engagement with a portion of a load, conduit means communicating with each said chamber for exhausting fluid therefrom and deforming said gaskets, a plurality of levers for each mat each lever having a load engaging arm and a force applying arm, a pivot intermediate said arms of each of said levers connecting each of said levers with a mat, and suspension elements connecting an intermediate portion substantially corresponding to the no load balance point of each of said force applying arms with said frame, said load engaging arms projecting beyond their respective gaskets for engagement with a load upon deformation of their gaskets.

12. Handling apparatus comprising a frame, a hollow mat entirely supported by said frame defining a chamber having an open end extending below said frame, a deformable sealing gasket secured at said open end for engagement with a portion of a load, conduit means communicating with said chamber for exhausting fluid therefrom and deforming said gasket, a plurality of sets of levers each having a load engaging arm and a force applying arm, a pivot intermediate said arms of each of said levers connecting each of said levers with said mat, and suspension elements connecting an intermediate portion substantially corresponding to the no load balance point of each of said force applying arms with said frame, said load engaging arms projecting beyond said gasket for engagement with a load upon deformation of said gasket.

13. Handling apparatus comprising a frame, a load gripping member secured to and entirely supported by said frame and extending therebelow for engagement with a portion of a load, energizing means communicating with said member for securing said frame to said load, a plurality of levers each having a load engaging arm and a force applying arm, a pivot intermediate said arms connecting each of said levers with said frame, biasing means applied to said levers urging said load engaging arms apart, and suspension elements connected to intermediate portions of said force applying arms adjacent points at which opposing moments applied to said levers at no load are substantially balanced.

14. Handling apparatus as set forth in claim 13 wherein said biasing means are adjustably secured to said force applying arms.

References Cited in the file of this patent

UNITED STATES PATENTS

| | | |
|---|---|---|
| 762,759 | Reuter | June 14, 1904 |
| 1,315,737 | Milmore | Sept. 9, 1919 |
| 1,865,380 | Moore | June 28, 1932 |
| 1,957,719 | Naugle et al. | May 8, 1934 |
| 2,347,491 | Lente | Apr. 25, 1944 |

FOREIGN PATENTS

| | | |
|---|---|---|
| 392,919 | Germany | Mar. 27, 1924 |